(12) United States Patent
Nimashakavi et al.

(10) Patent No.: US 9,118,653 B2
(45) Date of Patent: Aug. 25, 2015

(54) SYSTEM AND METHOD OF SECURE SHARING OF RESOURCES WHICH REQUIRE CONSENT OF MULTIPLE RESOURCE OWNERS USING GROUP URI'S

(71) Applicant: Oracle International Corporation, Redwood Shores, CA (US)

(72) Inventors: Kirankumar Nimashakavi, Fremont, CA (US); Xu Peng Wang, Beijing (CN); Yun Gao, Beijing (CN); Min Feng Xu, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/321,926

(22) Filed: Jul. 2, 2014

(65) Prior Publication Data

US 2014/0317697 A1 Oct. 23, 2014

Related U.S. Application Data

(63) Continuation of application No. 13/557,474, filed on Jul. 25, 2012, now Pat. No. 8,806,595.

(51) Int. Cl.
*H04L 29/06* (2006.01)
*G06F 21/33* (2013.01)
*G06F 21/40* (2013.01)
*G06F 21/62* (2013.01)

(52) U.S. Cl.
CPC .............. *H04L 63/08* (2013.01); *G06F 21/335* (2013.01); *G06F 21/40* (2013.01); *G06F 21/6218* (2013.01); *H04L 63/10* (2013.01)

(58) Field of Classification Search
CPC ....... G06F 21/31; G06F 21/335; H04L 63/104
USPC ................................................ 726/6, 7, 9, 10
See application file for complete search history.

(56) References Cited

U.S. PATENT DOCUMENTS

| 2011/0093925 | A1* | 4/2011 | Krishnamoorthy et al. ....... 726/4 |
| 2011/0179272 | A1* | 7/2011 | Klos et al. ...................... 713/168 |
| 2011/0225643 | A1 | 9/2011 | Faynberg et al. |
| 2011/0265172 | A1 | 10/2011 | Sharma et al. |
| 2012/0117626 | A1 | 5/2012 | Yates et al. |
| 2012/0208495 | A1 | 8/2012 | Lawson et al. |
| 2012/0226611 | A1 | 9/2012 | Radia et al. |
| 2013/0007846 | A1 | 1/2013 | Murakami et al. |
| 2013/0268680 | A1 | 10/2013 | Marton et al. |
| 2014/0007198 | A1 | 1/2014 | Durbha et al. |
| 2014/0040993 | A1 | 2/2014 | Lorenzo et al. |

\* cited by examiner

*Primary Examiner* — Edward Zee
(74) *Attorney, Agent, or Firm* — Tucker Ellis LLP

(57) ABSTRACT

In accordance with various embodiments, services gatekeeper systems and methods allow mapping and protecting communication services APIs with OAuth and group access to user information. Such a system can include a plurality of applications, executing on one or more application servers. The services gatekeeper is operable to define a group of members using a group URI, intercept requests for access to communication services APIs, obtain authorization from a group owner for access to a specified communication services API for each member of the group, and enable access to the specified communication services API of each member of the group in accordance with the scope authorized by the group owner.

13 Claims, 4 Drawing Sheets

SYSTEM AND METHOD OF SECURE SHARING OF RESOURCES WHICH REQUIRE CONSENT OF MULTIPLE RESOURCE OWNERS USING GROUP URI'S

CLAIM OF PRIORITY

This application is a continuation of U.S. patent application Ser. No. 13/557,474, filed Jul. 25, 2012 entitled "SYSTEM AND METHOD OF SECURE SHARING OF RESOURCES THAT REQUIRE CONSENT OF MULTIPLE RESOURCE OWNERS USING GROUP URI'S" which application is incorporated herein by reference in its entirety.

CROSS-REFERENCES TO RELATED APPLICATIONS

This application is related to all of the following patent applications, all of which are incorporated herein by reference in their entireties, including all Appendices filed therewith:

U.S. patent application Ser. No. 13/557,476, filed Jul. 25, 2012, entitled "SYSTEM AND METHOD OF EXTENDING OAUTH SERVER(S) WITH THIRD PARTY AUTHENTICATION/AUTHORIZATION"; and U.S. patent application Ser. No. 13/557,478, filed Jul. 25, 2012, entitled "SYSTEM AND METHOD OF MAPPING AND PROTECTING COMMUNICATION SERVICES WITH OAUTH".

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to a system and method of mapping and protecting resources and in particular to a gatekeeper system and method for secure sharing of resources which require consent of multiple resource owners.

BACKGROUND

Open Authorization Protocol (OAuth) is an open standard for authorization. OAuth allows users to, for example, share their private resources (e.g. photos, videos, contact lists) stored on one site with another site without having to hand out their credentials, typically supplying username and password tokens instead. Each token grants access to a specific site (e.g., a video editing site) for specific resources (e.g., just videos from a specific album) and for a defined duration (e.g., the next 2 hours). This allows a user to grant a third party site access to their information stored with another service provider, without sharing their access permissions or the full extent of their data. However, the OAuth protocol is insufficient for secure sharing of communication services in a telecommunications network.

Communication services Application Programming Interfaces (APIs) expose subscriber information such as charging capability, location, and profile to third party applications. For telecommunication network operators, this creates legal and security issues. Currently, no solution enables secure sharing of resources with subscriber consent. Moreover, according to the standard OAuth message flow, one access token can be issued by a designated resource owner. That leads to a limitation, when a resource access requires authorization from several resource owners. For example, obtaining location of multiple subscribers through a single resource (API) access is not possible using OAuth message flow because one subscriber cannot issue a token for another subscriber that could be included as part of the request. This problem is applicable to any resource(s) that contains multiple subscribers.

SUMMARY

In accordance with various embodiments, services gatekeeper systems and methods for mapping and protecting communication services resources are provided. Such a system can include a plurality of applications, executing on one or more application servers. The system can include a communications services gatekeeper system and method for supporting group authorization of API data access. Using this feature, subscribers can securely share their communication services (location, charging, presence,) with third party applications as a group using a list of subscribers as a parameter. This enables operators to facilitate exposure of subscriber resources while managing explicit subscriber consent.

Embodiments of the present invention provide a services gatekeeper system which allows mapping and protecting resources with OAuth and group access to subscriber information. A flexible mapping structure which can be used to map a plurality of different communication services APIs to provide access to subscriber information. Embodiments of the present invention further enable the use of group uniform resource identifiers (URI's) to enable a selected member to authorize API access to information of other members of the group.

In embodiments, the present invention provides a services gatekeeper and method which enables issuing one access token for a given group URI as the resource owner. This token can therefore be used to access resource on behalf of any members in this group. That is to say, the owner of group URI and password will be able to authorize an application to access protected communication services of each member in the group.

Other objects and advantages of the present invention will become apparent to those skilled in the art from the following detailed description of the various embodiments, when read in light of the accompanying drawings.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears. Likewise the first two digits in a four digit reference numeral.

Communication services APIs expose subscriber information such as charging capability, location, and profile to third party applications. For telecommunication network operators, this creates legal and security issues. Currently, no solution enables secure sharing of communication services APIs (resources) with subscriber consent. However, a services gatekeeper system and method as described herein is capable of mapping and protecting communication services resources as OAuth resources. In order to expose subscriber resources securely, the services gatekeeper system includes a mechanism that associates subscribers, subscriber communication services APIs (resource), and exposes and protects the APIs through authorization tokens. The system supports granular authorization of communication service access. In accordance with embodiments of the present invention, the services gatekeeper is also operable to define a group of members using a group URI, intercept requests for access to communication services APIs, obtain authorization from a group owner for access to a specified communication services API for each member of the group and enable access to the specified communication services API of each member of the group in accordance with the scope authorized by the group owner.

The services gatekeeper system maps a communication service into an OAuth resource. The OAuth resource definition is based on the interface and the method of the communication services. An OAuth resource can be defined either in a fine grain and/or coarse grain level using a flexible mapping structure. The flexible mapping structure can be used to map a plurality of different communication services to provide scoped access to subscriber information. However, according to the standard authorization message flow, one access token can be issued by a designated resource owner. That leads to a limitation, when resource access requires authorization from several resource owners. For example, obtaining location of multiple subscribers through a single resource (API) access is not possible using the stand OAuth message flow because one subscriber cannot issue a token for another subscriber that could be included as part of the request. To solve this limitation of the OAuth message flow, embodiments of the present invention provide a services gatekeeper and method which enables issuing one access token for a given group uniform resource identifier (URI) as the resource owner, this token can therefore be used to access the resource on behalf of any members in this group. That is to say, the owner of group URI and password will be able to authorize an application to access protected communication services of each subscriber who is a member of the group.

Figure 1:
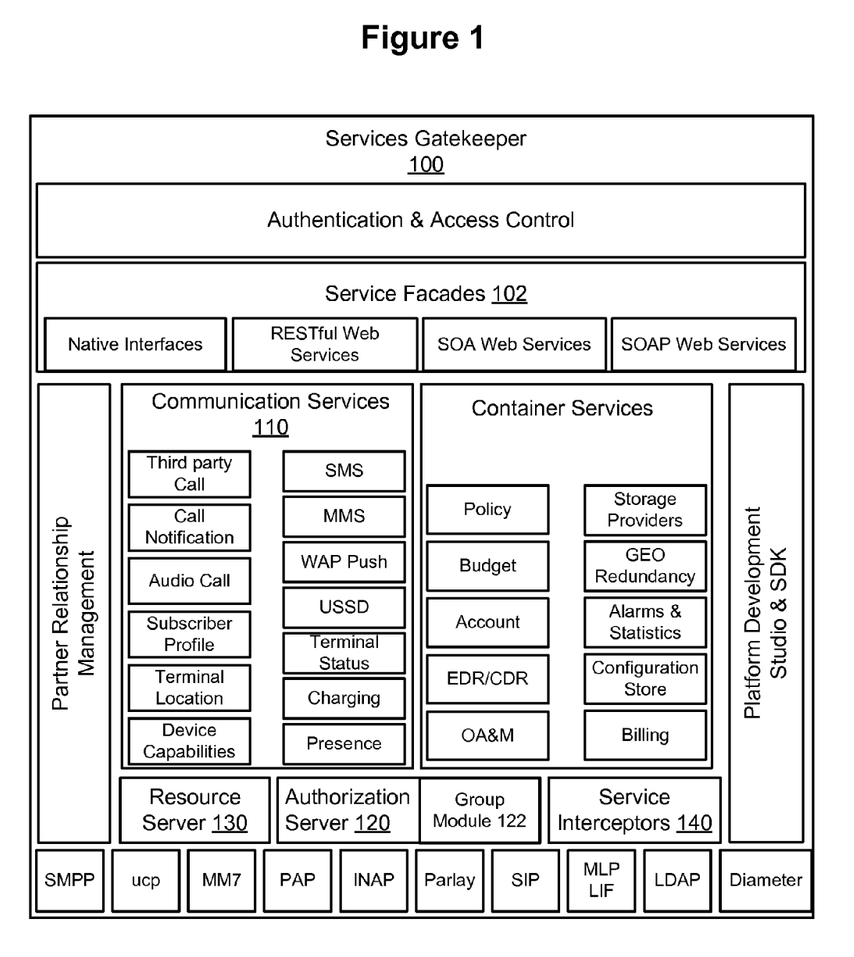
FIG. 1 shows a services gatekeeper, in accordance with an embodiment of the invention.

FIG. 1 shows elements of a services gatekeeper 100 in accordance with an embodiment of the invention. As shown in FIG. 1, services gatekeeper 100 controls access to a plurality of communication services 110. Services gatekeeper 100 facilitates the operator's need to provide third party service provider access to its key value-added network capabilities as well as third party APIs in a controlled, secure, optimized, and automated fashion, while providing robust customization and extensibility. Accordingly, services gatekeeper 100 includes service facades 102 which deliver a converged service exposure layer, providing operators the choice and flexibility of using traditional SOAP web services, RESTful web services, SOA web services, and native telecommunications interfaces to expose their network capabilities to third party partners. Accordingly, services gatekeeper 100 provides flexibility and choice in how third party developers and applications can access the operator's network through multiple types access interfaces (the service facades 102).

Services gatekeeper 100 includes pre-built, specialized components, the communication services 110, to allow third party developers and application partners to easily access the operator's telecommunications network capabilities. The network capabilities supported by the communication services include, for example, messaging, call control, terminal location, payment, profile and presence. These communication services 110 are APIs which expose subscriber information/resources such as the charging capability, location, and profile to third party applications and thus require subscriber authorization for access.

Services gatekeeper 100 includes authorization server 120 which provides an authorization service based on OAuth. The conventional OAuth protocol allows controlled access to user resources, for example, picture files identified by a URI. However, the conventional OAuth protocol has no mechanism for controlling access and exposure of communication services APIs enabling third party applications to access subscribers communication services 110 such as location and charging. By comparison, authorization server 120 includes extended functionality for controlling access and exposure of applications enabling third party applications to access these communication services 110.

Services gatekeeper 100 includes a system for mapping and protecting the communication services 110 (APIs) utilizing authorization server 120. Services gatekeeper 100 maps a communication services 110 into an authorization server 120 resource. The resource is defined based on the interface and the method of the communication services 110. The resource can be defined either in a fine grain and/or coarse grain level using a flexible mapping structure. The flexible mapping structure can be used to map a plurality of different communication services to provide scoped access to subscriber information. This scoped access allows the subscriber to provide access to specific portions of their information, e.g., provide access to only location information or charging information without providing access to all information. Thus, the services gatekeeper 100 enables mapping communication services 110 to authorization scopes and automatically protecting subscriber data exposed by the communication services 110 with fine granular control (API level, method level, parameter level) using authorization tokens. Requests to access communication services 110 are fulfilled using resource server 130 and service interceptors 140 when accompanied by valid tokens. The use of authorization server 120 to provided scoped access to communication services 110 is described in U.S. patent application Ser. No. 13/557,478, filed Jul. 25, 2012 entitled "SYSTEM AND METHOD OF MAPPING AND PROTECTING COMMUNICATION SERVICES WITH OAUTH", which is incorporated herein by reference.

Furthermore, services gatekeeper 100 provides an extended mechanism within authorization server 120 comprising a group module 122 which supports group URI and group ownership. Using this mechanism, subscribers can be dynamically added to a group and represented by a group uniform resource identifier (URI). Using the group URI, a designated group owner (a specified subscriber) can issue authorization to access the communication services of other subscribers who are members of the group (such as location and presence). For example, the functionality provided by group module 122 allows a designated group owner to issue authorization to allow an application to obtain subscriber location on behalf of each subscriber who is a member of the group.

Following from above, in services gatekeeper 100, a communication service (location, presence, etc.) 110 is mapped as a resource of authorization server 120. Resource server 130 and service interceptors 140 of services gatekeeper 100 manage the protected resources contained within a service provider's network and accepts and responds to third-party application requests for access to the communication services 110. Additionally, the above group module 122 which provides a mechanism for issuing one access token for a given group URI as the resource owner. This token can therefore be used to access resource on behalf of any members in this group. That is to say, the owner of group URI and password will be able to authorize application on accessing resources of each member in the group.

Figure 2A:
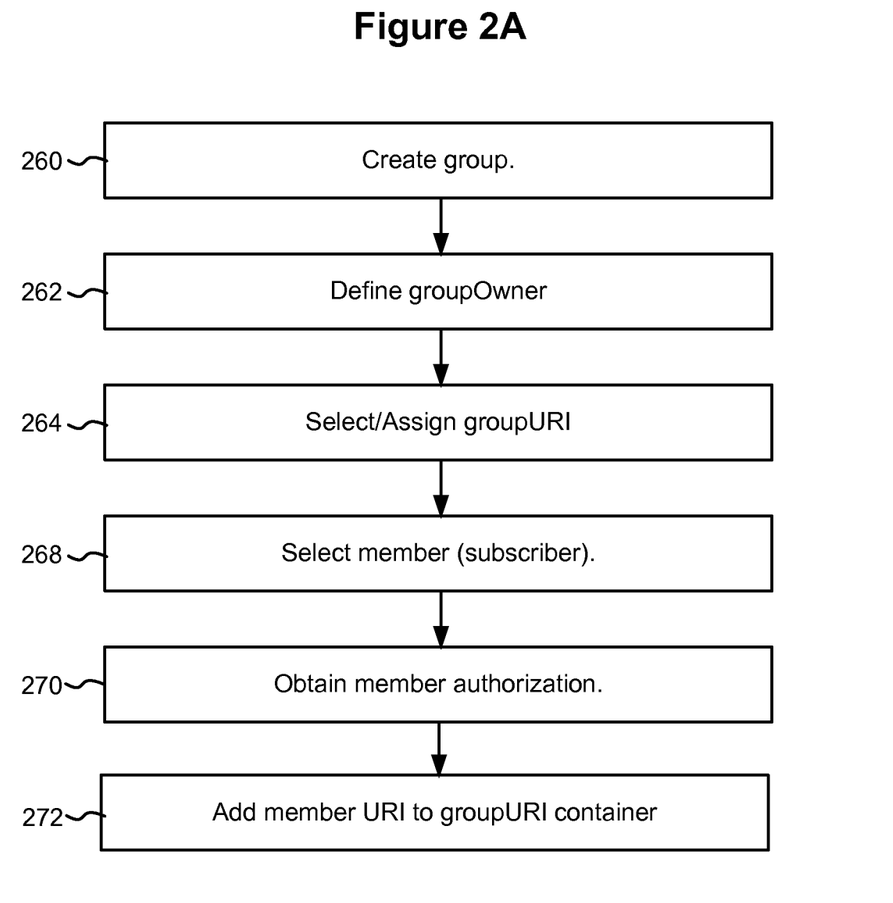
FIG. 2A shows a system and method for establishing a group, group owner and group members of a group in accordance with an embodiment of the invention.

FIG. 2A shows a system and method for establishing a group uniform resource identifier (URI) and group ownership. The system for provisioning a group URI, defining a group owner, and adding and deleting members in services gatekeeper 100 leverages PX 3.0 AddressListManagement (SOAP based communication service). Note however, that the member identifiers in this case are subscriber identifiers rather than email addresses. Moreover, in a preferred embodiment, when each member is added to a group, authorization server 120 (see FIG. 1) is used to obtain authentication of the subscriber and authorization from the subscriber for access to any communication services 110 over which the group owner will have authority to delegate. Using this mechanism, subscribers can be dynamically added to a group as group members and represented by a group URI. Once the group URI has been defined and the subscribers added as group members, the designated group owner can issue authorization to communication services resources (such as location or presence) on behalf of all group members.

As shown, in FIG. 2A, a group is created at step 260. As step 262 the group owner (a selected subscriber/user) is defined. The group owner will be defined by, e.g. a subscriber identifier. At step 264 the group uniform resource identifier (URI) is defined and/or assigned. At step 268 a subscriber is selected for addition to the group. At step 270 subscriber authorization is requested and obtained using authorization server 120. At step 272 the subscriber becomes a group member and the subscriber URI is added to the group. Additional functionality is provided for deleting, changing and/or querying members of the group.

In a preferred embodiment, the group is a network managed group which is created and managed within services gatekeeper 100 thereby allowing services gatekeeper 100 to directly reference the members of a group using the group name. In an alternative embodiment the group is an application managed group created and managed outside of the services gatekeeper 100 and requiring the group members to be passed into the services gatekeeper 100 for processing.

The group is itself a container for a set of subscriber identifiers. In use, services gatekeeper 100, with authorization and authentication by the group owner, processes the group by expanding the group into a set of subscriber identifiers. The resulting set of subscriber identifiers contains no groups, and any duplicate addresses are removed. Thus, a resolved group may be considered an exclusive union of all of its contained members/subscribers. A single access token granted with respect to a protected resource (communication service) of the group is valid with respect to the specified protected resource (communication service) of each member of the group without further authorization required by each member.

Figure 2B:
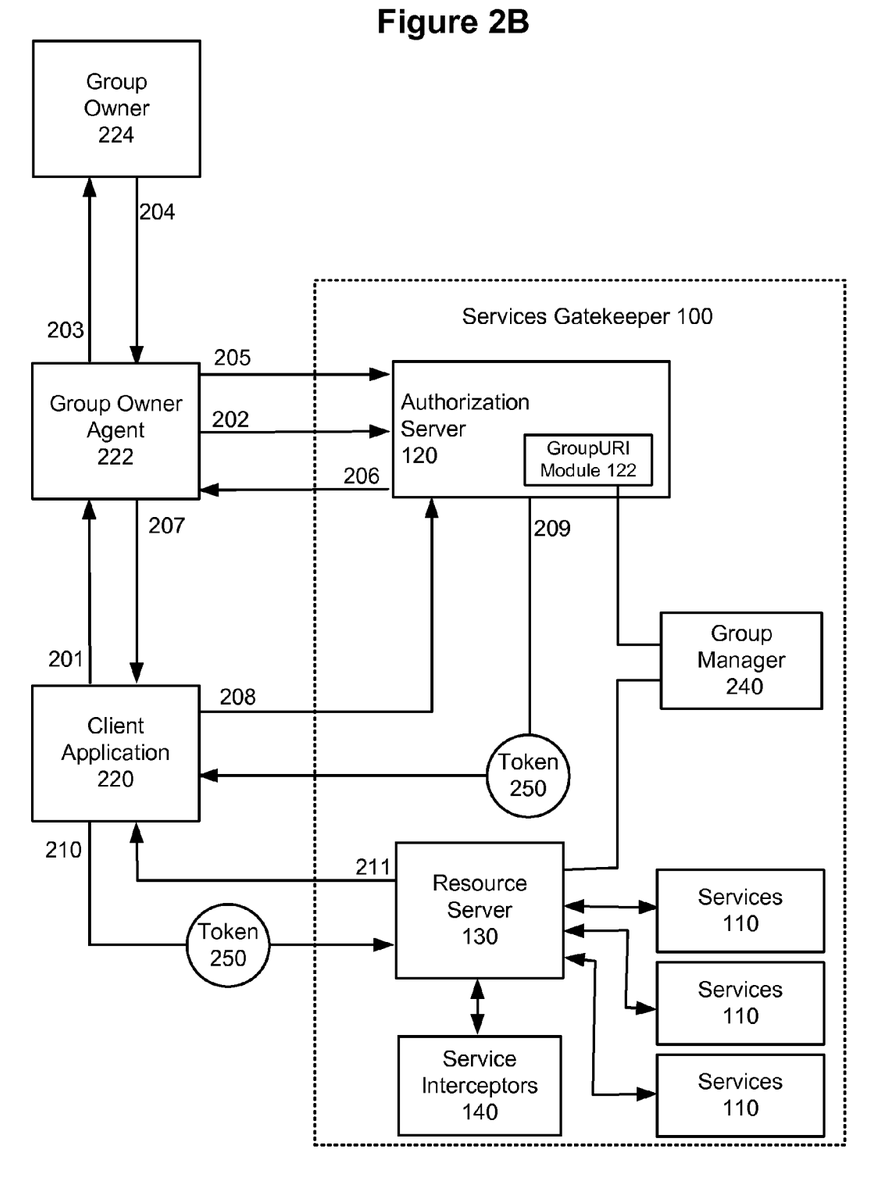
FIG. 2B shows authorization and authentication flow in an authorization and authentication system, in accordance with an embodiment of the invention.

FIG. 2B shows authorization and authentication flow in an authorization and authentication system, using a group URI in accordance with an embodiment of the invention. FIG. 2B illustrates authorization flow in services gatekeeper 100 whereby group access to communication services 110 (for example location) can be granted to a client application 220 in a secure manner with authorization by a group owner 224. The services gatekeeper 100 provides a system and method by which a client application 220 can access communication services 110 of members of a group with the permission of the group owner 224 (subscriber/user).

In general, before the client application 220 can access the communication services 110 for all members of a group, it must first obtain an authorization grant from the group owner 224 and then exchange the authorization grant for an access token 250 understood by the resource server 130. The access token 250 is a proxy which replaces different authorization constructs (e.g. username and password) which need not be disclosed to the client application 220. The access token 250 can specify a scope and duration. Moreover, the resource server 130 need not interpret and validate diverse authentication schemes as it can rely on the access token 250 alone. In an embodiment, the resource server 130 has access to group manager 240 which allows resource server 130 to expand the group URI to a set of subscriber identifiers in order to allow access to the specified communication services 110 for all members of a group.

As shown in FIG. 2B, in operation 201, the client application 220 initiates the flow when it directs the group owner agent 222 of the group owner 224 to the authorization endpoint of authorization server 120. The client application 220 includes its client identifier, requested scope, local state, and a redirection URI. The authorization endpoint receives and processes requests by client applications for permission to access protected resources. Generally, the group owner 224 as specified in the group URI grants permission by providing a username and password and selecting attributes or services to expose. An authorization code is granted to the client application 220 once permission is obtained from the group owner 224.

In operation 202, the group owner agent 222 transmits the request from the client application 220 to the authorization server 120. The authorization server 120 authenticates the group owner 224 through the group owner agent 222 and establishes whether the group owner 224 grants or denies the access request. In operation 203, the group owner agent 222 requests authorization from the group owner 224 (subscriber). In operation 204, the group owner 224 provides group owner credentials and authorization (if the request is approved) to the group owner agent 222. In operation 205, the group owner agent 222 relays the group owner credentials and approval to the authorization server 120. In operation 206, the authorization server 120 provides an authorization code. In operation 207, the group owner agent 222 relays the authorization code to the client application 220. The redirection URI includes an authorization code and any local state previously provided by the client application 220.

In operation 208, the client application 220 requests an access token 250 from the authorization server 120 through the token endpoint. The client application 220 authenticates with its client credentials and includes the authorization code received in the previous operation. The client application 220 also includes the redirection URI used to obtain the authorization code for verification. The authorization server 120 validates the client credentials and the authorization code. The authorization server 120 also ensures that the redirection URI received matches the URI used to redirect the client. In operation 209, if the request and token are valid, the authorization server 120 responds with an access token 250.

In operation 210, the client application 220 provides the access token 250 to the resource server 130. Services interceptor 140 verifies that the access token 250 contained in the request is valid before resource server 130 completes the request. One of services interceptor 140 and group manager 240 resolves the group into a set of subscriber identifiers in order to allow access to the specified communication services 110 for all members of a group. In operation 211, assuming the request and token are valid, resource server 130 responds with the requested access to the specified protected communication services 110 for all subscribers who are members of group (with the specified scope and parameters). The communication services 110 being, as discussed above, an API which exposes subscriber information such as, location.

Note that in the embodiment illustrated in FIG. 2B, the implementation provides a co-located authorization server and authentication server. However, in alternative embodiments authorization server 120 includes an authentication interface (not shown) defining a custom authentication/authorization flow supporting the separation of authentication and resource owner interaction from authorization in a services gatekeeper system. Using this feature, the services gatekeeper can integrate any authentication mechanism available in the world (for e.g., Facebook/Google/Subscriber or a custom identity management product). This feature enables operators of the system to use their own custom identity management systems or delegate the authentication service to a third party (e.g., Facebook Facebook/Google/Subscriber or a custom identity management product). When a client application requests access to protected group member resources, the services gatekeeper can communicate with a third party authentication server via a custom protocol to authenticate the group owner's credentials. Once authorized, the authentication server can notify the services gatekeeper system which then grants the application access to the requested protected communication services of the members of the group as previously described. The use of third party authentication servers is described in U.S. patent application Ser. No. 13/557,476, filed Jul. 25, 2012, now U.S. Pat. No. 8,782, 411, issued Jul. 15, 2014 entitled "SYSTEM AND METHOD OF EXTENDING OAUTH SERVER(S) WITH THIRD PARTY AUTHENTICATION/AUTHORIZATION" which is hereby incorporated herein by reference.

Figure 3:
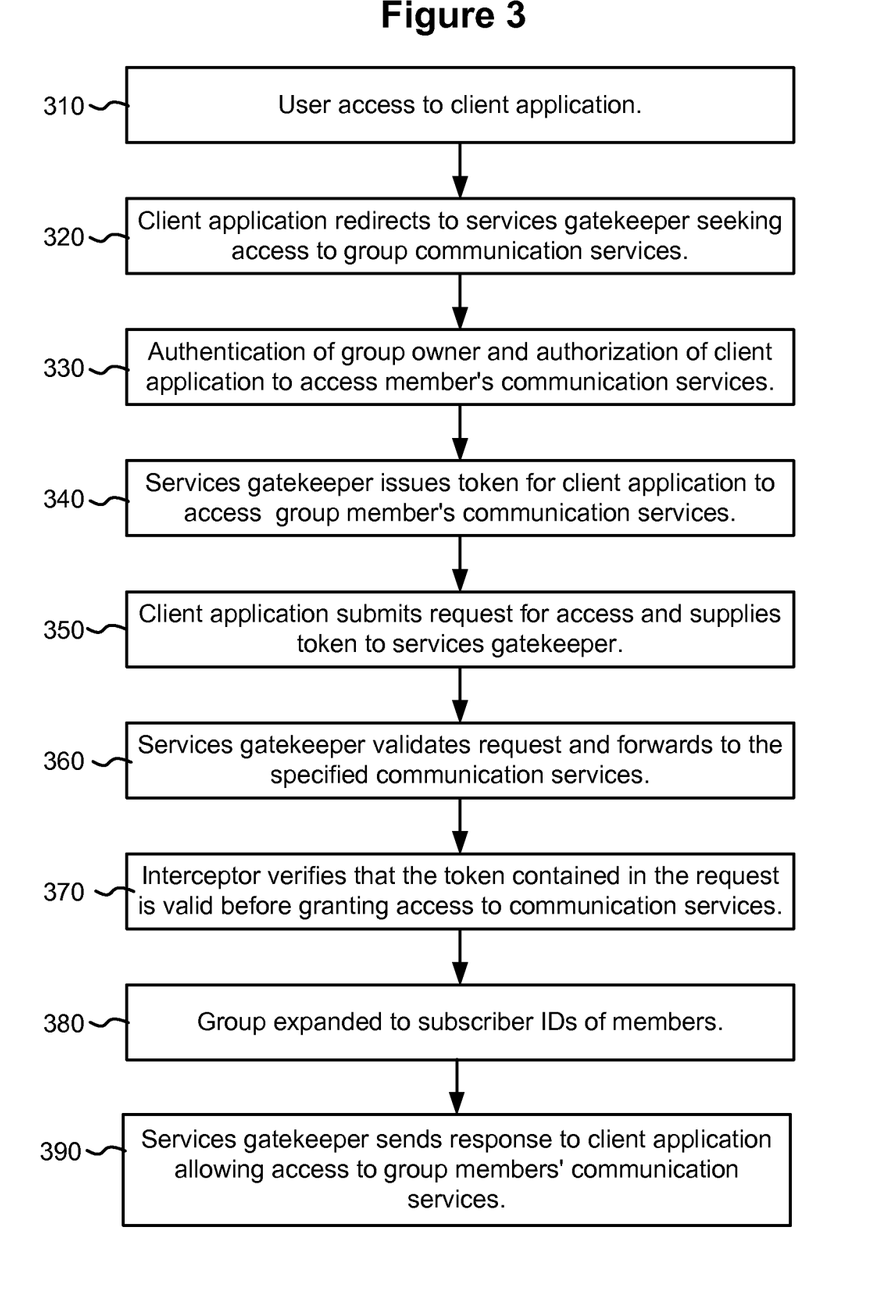
FIG. 3 shows a method for authorizing access to protected communication services, in accordance with an embodiment of the invention.

FIG. 3 shows a flow chart illustrating group access to the communication services 110 of members of a group through services gatekeeper 100 utilizing a group URI. At step 310 a subscriber (user) accesses, for example, an application which requires access to communication services 110 for each member of a group. As an illustration, a sales manager may want to expose all the members of his sales team to a sales force tracking application. At step 320, the third party client application redirects the group owner (sales manager) to services gatekeeper 100 for authentication and authorization. The redirect information identifies the group resource to which the third party client application wants access as well as subresources and parameters. At step 330, as an authorization server, services gatekeeper 100 obtains the group owner's permission for access to protected resources with the identified parameters (e.g. location). At step 340, services gatekeeper issues a token allowing access to the group resource with the specified parameters. At step 350, the third party client application requests access to a protected resource and supplies the token. At step 360, services gatekeeper checks the request, ensuring that the request contains the needed authorization information. If the request is valid, services gatekeeper forwards the request onto the proper communication services. At step 370, a services interceptor verifies that the token contained in the request is valid before completing the request. At step 380, the services gatekeeper resolves the group by expanding the group into a set of subscriber identifiers representing the members of the group. At step 390, the services gatekeeper then sends a response back to the client application with the requested access to the specified communication services (e.g. location) for each subscriber who is a member of the group.

Although the invention has been described above with respect to communication services in a telecommunications network, the invention also finds application in any situation where its is necessary or desirable to provide secure access to protected resources of a group of resource owners (users).

The present invention may be conveniently implemented using one or more conventional general purpose or specialized digital computer, computing device, machine, or microprocessor, and/or network of same, programmed according to the teachings of the present disclosure.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for providing access to user information for each of plural subscribers to a communication service, each subscriber having a corresponding subscriber identifier, comprising:
    a services gatekeeper, executing on one or more processors; and
    a communication services API that provides access to the user information of the subscribers to the communication service and the communication services API configured to expose user information of a particular subscriber on receipt of an access token corresponding to the subscriber identifier for the particular subscriber; and
    wherein when a request is received at an authorization server of the services gatekeeper from a client application to access the communication services API for exposing the user information of each member of a group, the group being a container identifying subscriber identifiers of the plural subscribers, the authorization server obtains authorization from a group owner to satisfy the request to access the communication services API, and, in response to receiving said authorization from said group owner issues an access token to the client application granting access to said communication services API for each member of the group; and
    wherein when the access token granting access to the communication services API for each member of the group is received by the services gatekeeper from the client application, the group is resolved to a set of the subscriber identifiers and the client application is granted access to the communication services API to obtain the user information of each of the plural subscribers.

2. The system of claim 1, wherein when the services gatekeeper receives the access token granting access to the communication services API for each member of the group, the services gatekeeper validates the access token granting access to the communication services API for each member of the group.

3. The system of claim 1, wherein the system further comprises:
    a group module;
    wherein the group module provides for specification of a group URI and the group owner and the container.

4. The system of claim 1, wherein the communication services API exposes subscriber location information.

5. The system of claim 1, wherein the communication services API exposes subscriber presence information.

6. The system of claim 1, wherein the request to access the communication services API comprises a group URI.

7. A method for providing group access to user information for each of plural subscribers to a communication service, each subscriber having a corresponding subscriber identifier, comprising:
    providing an authorization service, executing on one or more processors;
    providing a data structure comprising a group, the group being a container identifying subscriber identifiers of the plural subscribers, wherein the data structure maps the group to a group owner and a group owner identifier;
    receiving a request from a client application to expose the user information of each member of the group by accessing a communication services API that provides access to the user information of the subscribers to the communication service, the communication services API configured to expose user information of a particular subscriber on receipt of an access token corresponding to the subscriber identifier for the particular subscriber;
    obtaining, with the authorization service, authorization from the group owner associated with the group owner identifier to satisfy the request to access the communication services API for all members of the group
    in response to receiving said authorization from said group owner, issuing an access token to the client application granting access to said communication services API with respect to user information for all members of the group; and
    in response to receiving the access token granting access to the communication services API for each member of the group from the client application, validating the access token granting access to the communication services API for each member of the group and resolving the group to a set of the subscriber identifiers and allowing the client application to access the communication services API to obtain the user information of each of the plural subscribers.

8. The method of claim 7, wherein:
    the communication services API is a location API; and
    wherein the issuing the access token to the client application granting access to said communication services API with respect to user information for all members of the group comprises in response to receiving said authorization from said group owner, issuing the access token granting access to said location API with respect to user location information for all members of the group.

9. The method of claim 7, wherein:
    the communication services API is a presence API; and
    wherein the issuing the access token to the client application granting access to said communication services API with respect to user information for all members of the group comprises in response to receiving said authorization from said group owner, issuing the access token granting access to said presence API with respect to user presence information for all members of the group.

10. A non-transitory computer readable storage medium including instructions stored thereon which, when executed by a computer, cause the computer to provide group access to user information for each of plural subscribers to a communication service, each subscriber having a corresponding subscriber identifier, by performing the steps comprising:
    providing a data structure comprising a group, the group being a container identifying subscriber identifiers of the plural subscribers, wherein the data structure maps the group to a group owner and a group owner identifier;
    receiving a request from a client application to expose the user information of each member of the group by accessing a communication services API that provides access to the user information of the subscribers to the communication service, the communication services API configured to expose user information of a particular subscriber on receipt of an access token corresponding to the subscriber identifier for the particular subscriber;

obtaining authorization from the group owner associated with the group owner identifier to satisfy the request to access the communication services API for all members of the group;

in response to receiving said authorization from said group owner, issuing an access token to the client application granting access to said communication services API with respect to user information for all members of the group; and in response to receiving the access token granting access to the communication services API for each member of the group from the client application, validating the access token granting access to the communication services API for each member of the group and resolving the group to a set of the subscriber identifiers and allowing the client application to access the communication services API to obtain the user information of each of the plural subscribers.

11. The non-transitory computer readable storage medium of claim 10, wherein:

the communication services API is a location API enabling access to a user location information; and wherein the instructions stored on the non-transitory computer readable storage medium, when executed by the computer, cause issuing the access token granting access to said location API with respect to user location information for all members of the group.

12. The non-transitory computer readable storage medium of claim 10, wherein:

the communication services API is a presence API enabling access to a user presence information; and wherein the instructions stored on the non-transitory computer readable storage medium, when executed by the computer, cause issuing the access token granting access to said presence API with respect to user presence information for all members of the group.

13. The non-transitory computer readable storage medium of claim 10 wherein the instructions stored on the non-transitory computer readable storage medium, when executed by the computer, further cause the computer to perform the steps of:

using a group module to specify a group URI and the group owner and the container.

* * * * *